Patented Nov. 12, 1929

1,735,674

UNITED STATES PATENT OFFICE

HARRY N. COPELAND, OF DAYTON, OHIO, ASSIGNOR TO THE KURZ-KASCH COMPANY, OF DAYTON, OHIO, A CORPORATION OF OHIO

METHOD OF MOLDING AND ARTICLE PRODUCED FROM PLASTIC MATERIAL IN IMITATION OF ONYX, AGATE, MARBLE, AND THE LIKE

No Drawing.    Application filed October 4, 1926.   Serial No. 139,556.

This invention relates to the molding of plastic materials and more particularly to the production of an ornamental surface of pleasing appearance, somewhat in imitation of natural onyx, agate, marble, and the like, upon articles molded therefrom.

While the method is herein described as applied to the molding of synthetic resins, phenolic condensation material and other substances of analogous character, it is to be understood that it is capable of application to a wide variety of materials. The present invention is a further development and amplification of the invention disclosed in patent to Harry N. Copeland, No. 1,593,525, dated July 20, 1926, which pertains to the imitation of wood graining upon molded articles.

The present invention involves the use of materials of different colors and of different consistencies or capable of assuming different degrees of plasticity. Bodies of various sizes of the differently colored material are intermixed with each other. These bodies of irregular size and shape may be comparatively large, depending somewhat upon the size of the article to be molded and the character of the surface markings desired. The character of the material is such that when one of the materials, preferably though not necessarily that possessing the predominating color is in a plastic, viscous or "mushy" state, and capable of being molded, the material of other color or colors will be in a more freely flowing condition. The latter material will not only fill the spaces between the masses of the plastic or less free flowing material but will follow the small interstices and crevices, forming irregular streaks, veins and hair lines. In areas where the plastic or less free flowing material does not initially contact the mold, the differently colored more liquid material will form a thin film of varying thickness over the surface of the more dense material. The effect is heightened by employing a material of translucent character which will show the underlying material of dominating color through such film in varying tints and which will afford diminishing streaks and hair lines on the surface of the masses of dominant colored material. Such material of translucent character will also give to the product a pleasing luster or seemingly polished surface, quite similar to that of polished onyx, agate, marble and the like. The method permits of the use of a wide variety of color combinations, whether the materials are of translucent or opaque character, or a combination thereof. The effect may also be varied by changing the proportions of translucent and opaque material in the mixture. By employing a predominating quantity of translucent material of different colors onyx and agate may be imitated. The use of opaque materials of different color and capable of assuming different degrees of plasticity enables the imitation of marble with various markings.

While as before mentioned various materials having different fusing points or capable of being reduced to different degrees of plasticity may be employed, phenolic condensation materials are preferred because of their permanency and durability and the wide variety of colors in which they are obtainable as well as their other variable characteristics, which make them especially adaptable to the present process. Phenolic condensation materials are obtainable possessing wide variation of fusing points. Some require quite high temperature to soften or render plastic while others become quite fluid under like conditions. Such material may also be had transparent and in varying degrees of translucency.

In carrying out the method or process phenolic condensation materials or the like are selected according to the desired combination of colors and are intermixed in the approximate proportions in which it is desired the various colors shall appear in the design. These materials are preferably in coarse granular form or in pieces of comparatively large sizes. The dominant color is preferably in comparatively large bodies, while the material intended to produce the streaks, veins, hair lines and color splotches of the design is preferably in smaller pieces, distributed among the larger bodies of dominating colored material. Such material in measured quantity is placed in the mold. The material is preferably though not necessarily cold pressed into tablets or slugs containing the requisite amount of material for the particular article to be molded.

The usual commercial mixture of phenolic condensation material begins to fuse or become plastic at approximately two hundred to two hundred and twenty degrees, Fahrenheit, and becomes more or less "mushy" or plastic at a temperature of approximately two hundred and sixty to three hundred degrees, Fahrenheit. Beyond three hundred degrees a chemical reaction takes place and the material which at a lower temperature became soft and plastic at the higher temperature becomes set or hardened. In the present process the material of dominant color may be commercial phenolic condensation material. However the material employed to demark the streaks, veins, and lines of the design, is of a much lower fusing point. In the practice it has been found that the synthetic resins which are of phenolic character but fuse at a much lower temperature than the commercial phenolic condensation material makes a suitable combination with such commercial material. The phenolic condensation material employed in the present process is fused at a subnormal temperature. That is to say the fusing temperature is somewhat below that normally employed, in phenolic molding operations, so that the material does not become fluid or free flowing but assumes a plastic condition in which it may be molded but will not mix with the accompanying colored material. This accompanying colored material having a much lower fusing point becomes liquid at the same subnormal temperature which renders the dominating material only plastic. As a consequence when subjected to pressure the liquid material of lower fusing point, preferably though not necessarily a synthetic resin of phenolic character, will flow freely between the larger bodies of plastic material of dominating color, filling all crevices and openings and spreading over the surface of such dominating colored plastic material where the contact with the mold is not perfect. This distribution of the liquid or highly fused material over and around the bodies of more dense material having the higher fusing point, produces intricate fanciful designs in close imitation of onyx, marble or agate. The initial molding operation and irregular distribution of material having been effected at a subnormal molding temperature, the molded article is then subjected to a curing temperature, preferably in excess of three hundred degrees Fahrenheit, in the usual manner, thereby causing the material to set and harden with the surface design permanently fixed therein. The synthetic resins before mentioned as well as some forms of commercial phenolic condensation materials are of more or less transparent, or translucent character. The use of such materials, particularly where one material overflows the other in a thin film, produces a graduated tinted effect. The process is quite flexible in affording a wide range and variety of effects and designs.

The materials of both high and low fusing points may be both opaque or they may be both translucent. As a further variation the material of high fusing point and of dominant color may be either translucent or opaque and the colored material forming the design and of lower fusing point may be of the contrary characteristic. Still further variations of effect can be had by minimizing the quantity of high fusing material and employing a predominating quantity of material fusing at the lower temperature.

From the above description it will be apparent that there is thus afforded a process of surface ornamentation of articles molded from plastic material, in imitation of onyx, marble and agate, and the like or the production of other fanciful designs and whereby such articles may be given the appearance of a polished surface, which process possesses the particular features of advantage before enumerated as desirable, but which obviously is susceptible of modification in its steps, the form, proportions and character of materials and details of operation without departing from the principle involved or sacrificing any of its advantage.

While in order to comply with the statute the invention has been described in language more or less specific as to material, steps, and features of procedure, it is to be understood that the invention is not limited to the details described but that the means and process herein disclosed comprises the preferred form of several modes of putting the invention into effect, and the invention is therefore claimed in any of its forms or modifications within the legitimate and valid scope of the appended claims.

Having thus described my invention, I claim:

1. The herein described method of producing ornamental surfaces upon articles molded from plastic materials, consisting in intermixing bodies of differently colored materials reducing one of the materials to a plastic condition and reducing the other material to a substantially liquid condition, and molding the material under pressure whereby the more liquid material is unequally distributed in the mass and caused to fill the openings and irregularities occurring in the body of plastic differently colored material.

2. The herein described method of producing ornamental surfaces upon articles molded from plastic materials, consisting in intermixing bodies of a translucent material and an opaque material, and reducing said intermixed materials to different degrees of plasticity and molding under pressure whereby one of the materials will be caused to fill the openings between and the irregularities of surface of the body of the other material.

3. The herein described method of producing ornamental surfaces upon articles molded from plastic materials, consisting in intermixing bodies of differently colored materials, reducing the intermixed colored materials to different degrees of plasticity and molding to material under pressure whereby one of the colored materials will be caused to fill openings between and irregularities of surface of the body of the differently colored material.

4. The herein described method of producing ornamental surfaces upon articles molded from plastic material, consisting in distributing in a mold irregularly shaped masses of colored material and filling the intermediate spaces and surface irregularities of such bodies with a differently colored material of increased mobility, whereby such filling material will flow about the masses of first mentional material to produce irregular streaks, lines and spots upon the finished product.

5. The herein described method of producing ornamental surfaces upon articles molded from plastic material, consisting in intermixing differently colored materials having different fusing points subjecting the intermixture to substantially uniform heat treatment whereby the materials will be fused to different degree, and subjecting the fused mixture to pressure whereby one of the colored materials will be caused to fill the interspaces and surface irregularities of the material having the higher fusing point.

6. The herein described method of producing ornamental surfaces upon articles molded from plastic material, consisting in placing in a mold a quantity of opaque material and a quantity of translucent material, reducing the materials to different degrees of plasticity and molding under pressure whereby the translucent material will be distributed as a film over the surface of the less plastic opaque material.

7. The herein described method of producing ornamental surfaces upon articles molded from plastic material, consisting in placing together in a mold, a quantity of opaque material and a quantity of translucent differently colored material, reducing the materials to different degrees of plasticity and molding under pressure whereby the more plastic translucent material will be caused to fill the surface irregularities of the opaque material by forming thereover a film of varying thickness and of varying degrees of tint.

8. The herein described method of producing ornamental surfaces upon articles molded from plastic material, consisting in placing together in a mold a quantity of colored molding material and a quantity of translucent material, reducing the molding material to a plastic condition and reducing the translucent material to a substantially liquid condition and molding under pressure whereby the translucent material is caused to overflow the surface of the plastic molding material to produce thereon the effect of a polished surface.

9. The herein described method of producing an ornamental surface upon articles molded from plastic material, comprising intermixing bodies of materials of different colors, fusing said materials to different degrees thereby rendering one of said materials plastic and the other material liquid whereby the more freely flowing material will fill the openings between and follow the crevices and irregularities of the less free flowing material to produce an irregular surface design upon the finished product.

10. The herein described method of producing an ornamental surface upon articles molded from plastic material, consisting in intermixing bodies of differently colored materials treating the material to effect in the differently colored materials different degrees of plasticity and subjecting the plastic mixture to pressure whereby the more plastic material will be distributed and caused to fill the openings, crevices and irregularities of the less plastic materials of a different color.

11. The herein described method of producing variegated surface designs upon articles molded from phenolic condensation materials or the like, consisting in intermixing various sizes of pieces of phenolic condensation materials of different colors and having different fusing points, subjecting the intermixture to heat whereby the differently colored materials are fused to different degree, and molding under pressure thereby causing the interspaces and surface irregularities of the less fluid material to be filled by the more fluid differently colored material.

12. The herein described method of producing variegated surface designs upon articles molded from phenolic condensation materials or the like, consisting in intermixing various sizes of pieces of phenolic condensation materials of different colors and having different fusing points the pieces of one color being translucent and those of the other opaque, subjecting the intermixture to heat whereby the different materials will be fused to different degree and molding under pressure thereby causing the interspaces and surface irregularities of the less fluid material to be filled by the more fluid differently colored material.

13. As an article of manufacture, an article molded from differently colored plastic materials of different densities, having a part of the material arranged in irregular streaks, veins, and splotches in simulation of onyx, marble or the like.

14. As an article of manufacture, an article molded from plastic material of different degree of plasticity whereby a portion of the material will possess a greater degree of mobility and having therein irregularly distributed translucent, streaks, veins and spots resulting from the relative distribution of different portions of the material, substantially as specified.

15. As an article of manufacture, an article molded from phenolic condensation material of different colors, wherein one of the materials is of opaque and the other of translucent character and irregularly distributed flow lines in the surface of the article formed by the relative movement of the materials during the molding operation, to afford a fanciful ornamental surface design.

16. As an article of manufacture an article molded from plastic material of different colors, wherein one of the materials defines irregular flow lines upon the surface of another less mobile material in simulation of natural marble, or the like.

17. As an article of manufacture, an article molded from phenolic condensation material or the like, of different character and colors wherein translucent material and opaque material are combined and irregular streaks, veins and splotches are formed by the relative movement and distribution of the respective materials within the mold in simulation of natural onyx, marble, or the like.

18. As an article of manufacture, an article molded from plastic material and characterized by irregular translucent streaks, and veins defining flow lines effected by relative movement of portions of the material in the mold, in imitation of onyx or the like.

19. As an article of manufacture, an article molded from plastic material of different colors and of different degrees of mobility, wherein flow lines of one color of material effected by the movement of one material to the other are defined by elongated irregular streaks and veins in simulation of natural stone formations.

20. As an article of manufacture, an article molded from phenolic condensation material of different characteristics, wherein a translucent material is distributed in a fluid condition over the surface of a less fluid opaque material in simulation of a polished surface.

21. As an article of manufacture, an article molded from plastic materials of different degrees of mobility, wherein the relative movement of the materials during the molding operation affords an ornamental irregularly streaked and veined surface of different colors in simulation of natural onyx and marble markings and the like.

In testimony whereof, I have hereunto set my hand this 16th day of September, 1926.

HARRY N. COPELAND.